(12) United States Patent
Yamazoe

(10) Patent No.: US 7,599,552 B2
(45) Date of Patent: Oct. 6, 2009

(54) IMAGE PROCESSING APPARATUS, AND COLOR CORRECTION METHOD AND LOOKUP TABLE

(75) Inventor: Manabu Yamazoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 10/736,498

(22) Filed: Dec. 17, 2003

(65) Prior Publication Data

US 2004/0126010 A1   Jul. 1, 2004

(30) Foreign Application Priority Data

Dec. 18, 2002   (JP) .............................. 2002-366914

(51) Int. Cl.
   *G06K 9/00*   (2006.01)
(52) U.S. Cl. ................... 382/167; 382/162; 382/165
(58) Field of Classification Search ......... 382/162–167, 382/293; 345/589, 604; 358/518–540
   See application file for complete search history.

(56) References Cited

U.S. PATENT DOCUMENTS

| | | | | |
|---|---|---|---|---|
| 5,089,882 A | * | 2/1992 | Kaye et al. ................. | 348/645 |
| 5,200,832 A | * | 4/1993 | Taniuchi et al. ............. | 358/300 |
| 5,517,335 A | * | 5/1996 | Shu ............................. | 358/518 |
| 5,809,181 A | * | 9/1998 | Metcalfe ...................... | 382/276 |
| 5,867,286 A | * | 2/1999 | Lee et al. ..................... | 358/523 |
| 6,650,336 B2 | * | 11/2003 | Suzuki ......................... | 345/589 |
| 6,757,427 B1 | * | 6/2004 | Hongu ......................... | 382/164 |
| 2002/0172203 A1 | * | 11/2002 | Ji et al. ......................... | 370/392 |
| 2003/0052895 A1 | | 3/2003 | Akiyama et al. ............ | 345/589 |

* cited by examiner

*Primary Examiner*—John B Strege
(74) *Attorney, Agent, or Firm*—Fitzpatrick, Cella, Harper & Scinto

(57) ABSTRACT

In a color conversion method of inputting at least two color difference values and obtaining a corresponding saturation value, a main lookup table which stores the saturation value for the color difference values, and a sub-lookup table for obtaining an address for accessing the main lookup table, are created. An address to be used in accessing the main lookup table is determined on the basis of the sub-lookup table and the difference between the two color difference values, in correspondence with two arbitrary color difference values. A saturation value corresponding to the two color difference values is obtained from the determined address of the main lookup table.

4 Claims, 9 Drawing Sheets

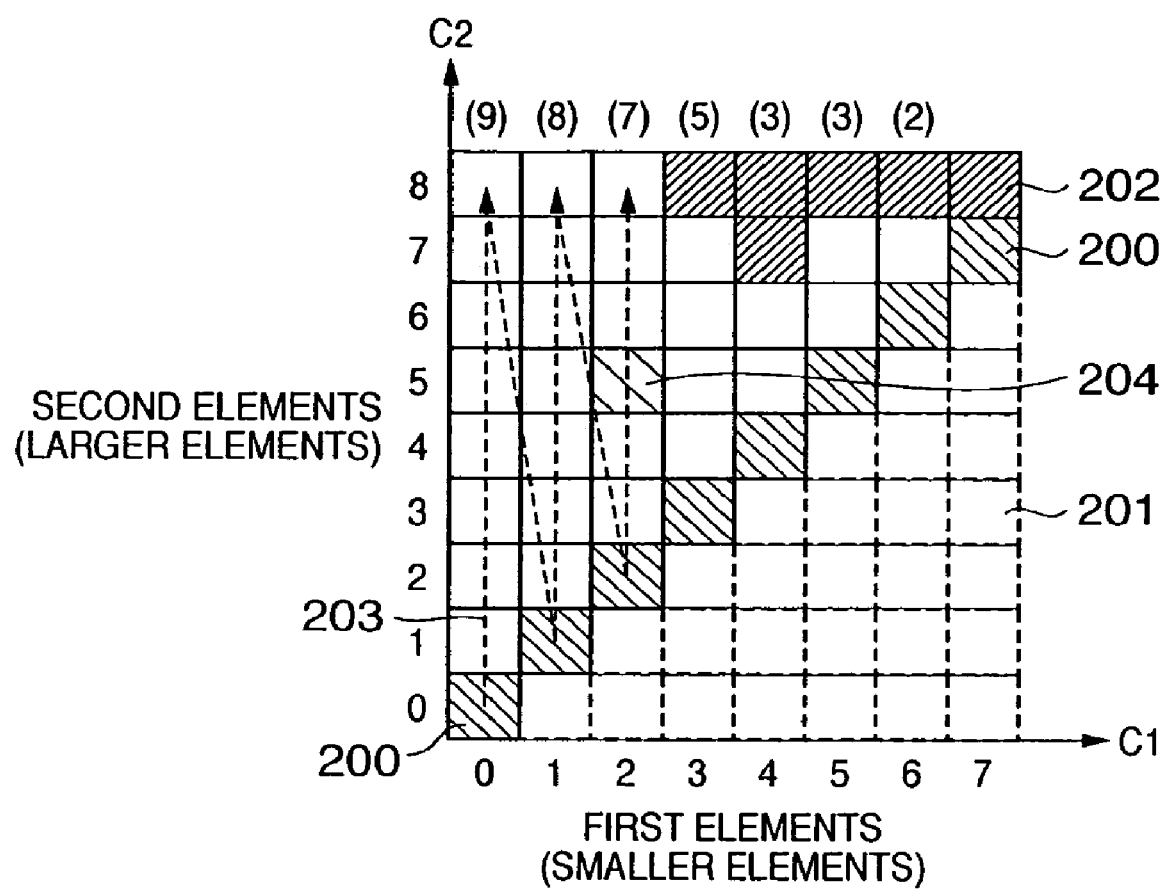
F I G. 2

US 7,599,552 B2

IMAGE PROCESSING APPARATUS, AND COLOR CORRECTION METHOD AND LOOKUP TABLE

FIELD OF THE INVENTION

The present invention relates to a technique of inputting at least two color difference values, obtaining a saturation value corresponding to these color difference values, and performing color correction and, more particularly, to a technique of efficiently calculating the saturation and hue angle in color information at high speed.

BACKGROUND OF THE INVENTION

Various methods and apparatuses have conventionally been proposed for color correction of a digital color image. In many color correction processes, the color is managed and corrected in terms of "three attributes of color", i.e., brightness Y, hue angle H, and saturation S. A representative example is an L*a*b* color space. In this color space, the color can be processed by means of the three attributes, and the color can be intuitively managed and grasped. Digital color data is generally managed by R, G, and B signals. In practice, it is difficult theoretically to manage the color by means of these R, G, and B signals in color correction. For example, in the L*a*b* color space, the saturation S and hue angle H are obtained by $$S=(a^{*2}+b^{*2})^{1/2}$$

$$H=\tan^{-1}(b^*/a^*)$$

Calculation of the saturation and hue angle using these equations requires calculations using a root function and trigonometric function. When these functions are calculated by, e.g., software running on a personal computer, a standard function such as those in the C language can be utilized, but "floating-point calculation" is generally required. In a system which cannot adopt "floating-point calculation", the function is realized by an algorithm such as "extraction of square root" which realizes the root calculation by means of arithmetic involving only integer calculation. Alternatively, the trigonometric function is tabled as far as necessary precision can be maintained, and the calculation result of the trigonometric function is obtained by looking it up the table.

The above-mentioned "floating-point calculation" generally involves a large processing load, and an algorithm using only substitute integer calculation requires a still larger one. As described above, the saturation and hue are the most fundamental elements in color correction, and the load necessary for conversion processing depends on the number of pixels of a digital image. That is, the processing load increases along with an increase in the number of pixels. It is, therefore, very important to obtain the saturation and hue efficiently and at high speed.

By giving attention to the fact that the saturation S and hue angle H can be calculated from the two color difference signals a* and b*, it can be easily anticipated that the calculation speed can be increased by means of a two-dimensional lookup table (to be referred to as an "LUT" hereinafter) capable of containing the maximum and minimum values of each element. This method, however, requires a very large memory, and is inefficient.

SUMMARY OF THE INVENTION

The present invention has been made in consideration of the above situation, and has as its object to minimize the number of entries in a lookup table for the saturation and hue angle, and efficiently performs color correction at high speed by means of the lookup table.

According to the present invention, there is provided a color conversion method of inputting at least two color difference values and obtaining a corresponding saturation value, comprising steps of: creating a main lookup table which stores saturation value for the color difference values, and a sub-lookup table for obtaining an address for accessing the main lookup table; determining the address of the main lookup table in correspondence with two color difference values on the basis of the sub-lookup table and a difference between the two color difference values; and obtaining a saturation value corresponding to the two color difference values from the address determined in the determining step.

Further, there is provided a lookup table for obtaining an output value defined for an input value, comprising: a main lookup table adapted to, when a definition of an output value has or is regarded to have symmetry for a plurality of input values, or when a combination of the plurality of input values is limited by a specific existence condition, store the output values for the plurality of input values in consideration of at least one of the symmetry and the specific existence condition; and a sub-lookup table adapted to store an address of an entry in which the plurality of input values are the same, wherein an address of the main lookup table is determined on the basis of the sub-lookup table and a difference between the two input values, in correspondence with two arbitrary input values.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 depicts a graph for explaining the principle of the embodiment of FIG. 1;

DETAILED DESCRIPTION OF THE PREFERRED EMBODIMENTS

The preferred embodiments of the present invention will be described in detail below with reference to the accompanying drawings. Before the description of each embodiment, the principle of the embodiment will be briefly explained.

The number of entries of an LUT (LookUp Table) is devised to be substantially halved by utilizing "symmetry" in obtaining the saturation and hue angle. The LUT is specialized in a color space for performing image processing and is so formed as to cover only the color range. In order to obtain necessary results (saturation and hue angle) from the LUT formed in this manner, a main LUT for storing necessary results themselves and a sub-LUT for efficiently accessing an address of the main LUT that corresponds to a combination of necessary elements (in this case, color difference signals) are prepared. A result stored in the main table is obtained by calculating the lookup address of the main LUT from the sum of a value obtained by looking up the sub-LUT for a smaller one of two elements (saturation and hue angle) and the difference (absolute value) between the two elements. To obtain the hue angle, a result obtained from the main LUT is processed in accordance with a combination of the signs of the two elements and their magnitude relationship, thereby covering the color space.

Image processing to be described below is realized by supplying an image processing program to a computer apparatus such as a personal computer. An assumed image processing program includes driver software which receives an image from an image input device or the like, image editing software which edits an image, and driver software such as a so-called printer driver which outputs an image to an image output device.

The following image processing is executed not only by a computer device, but also by an image input device or image output device. Especially when an image input device such as a digital camera and an image output device such as an ink-jet printer are directly connected to print an image photographed by the digital camera, the following image processing is performed by the image input device or image output device.

Before a detailed description of the first preferred embodiment, image processing to which the embodiment is applied will be explained with reference to the flow chart of FIG. 1.

Figure 1:
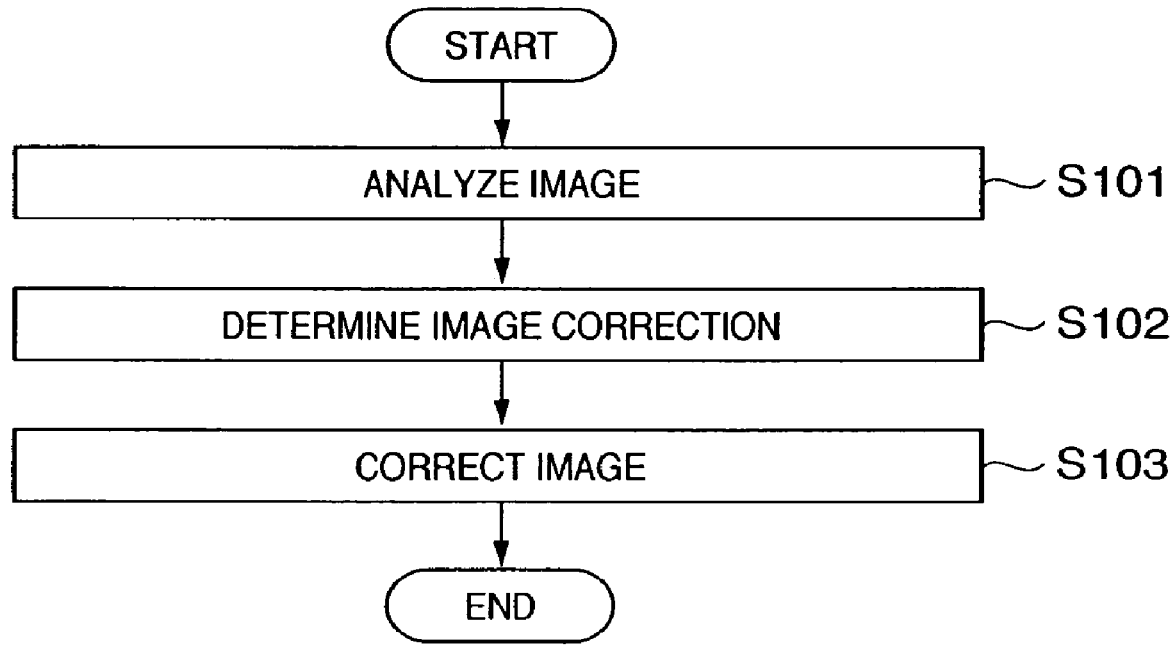
FIG. 1 is a flow chart showing an example of image processing according to an embodiment of the present invention.

FIG. 1 is a flow chart showing an example of image correction processing according to the first embodiment.

In step S101, an input image is analyzed. In this step, the feature of the input image is analyzed on the basis of the brightness histogram, saturation histogram, or hue histogram. In step S102, image correction processing is determined on the basis of the analysis result obtained in step S101. The processing advances to step S103 to execute image correction processing in accordance with the correction method determined in step S102. The types of image correction that can be performed according to the present embodiment are not limited by the particular contents of the given type of image correction, and this embodiment can be applied to all operations which process the saturation and hue in the course of image correction.

The principle according to the embodiment will be explained by reference to a YCC color space. The YCC color space is formed for a general 24-bit RGB digital image signal by three elements:

$Y = 0.3R + 0.59G + 0.11B$ $C1 = R - Y$ $C2 = B - Y$

However, the present invention is not limited to the YCC color space, and can also be applied to the L*a*b* color space and L*u*v* color space.

[Description of Principle]

The principle according to the first embodiment will be described in detail with reference to FIG. 2. In this embodiment, an LUT of output values is generated for input values in a possible range (domain), with respect to a function F(x,y) for obtaining an output value corresponding to two input values (integers).

A case in which a saturation for two color difference signals C1 ($0 \leq C1 \leq 7$) and C2 ($0 \leq C2 \leq 8$) is obtained from the LUT will be described. Each block (corresponding to each cell) in FIG. 2 corresponds to an output value LUT to be looked up.

If an LUT is created for all combinations, a table having 8×9=72 entries is required. A saturation calculated in advance is stored in each entry, and the saturation can be obtained from the created LUT for an arbitrary combination (C1 and C2).

For example, the saturation S is defined by $S = \{(C1)^2 + (C2)^2\}^{1/2}$ and has symmetry for two input values. That is, saturations stored in respective blocks (LUT) of FIG. 2 are apparently symmetrical about hatched blocks 200. Blocks 201 represented by broken lines in FIG. 2 (lower right blocks below the hatched blocks 200) are substantially unnecessary.

Further, some regions do not exist in the color space. In other words, not all combinations of two input values in the domain correspond to points in the space. Such nonexistent regions are represented by black blocks 202 in FIG. 2.

From this, the number of blocks (i.e., the number of entries) necessary to refer to the saturation is 72—the number of unnecessary blocks (34 in the example of FIG. 2)=38. In this manner, the feature of the present embodiment is to minimize the LUT size by utilizing symmetry of an output value for input values and considering the existence condition of various combinations of input values.

A method of efficiently looking up information in an LUT created in the above way will be explained. For example, if the LUT is n-dimensionally uniform (in FIG. 2, a set of blocks is rectangular), the table can be easily accessed for an arbitrary input value. That is, an LUT address corresponding to an arbitrary input value can be easily calculated.

If, however, the block (LUT) is created as shown in FIG. 2, it becomes difficult to calculate an address corresponding to an arbitrary combination. For this reason, the present embodiment utilizes a sub-LUT in addition to the main LUT for referring to an output value.

A method of creating the main LUT and sub-LUT will be explained in more detail with reference to FIG. 2.

The main LUT is created along an arrow (chain line) 203 in FIG. 2. Entries associated with necessary blocks are created from the bottom to top with respect to C1, i.e., in a direction in which C2 increases from a small value. Addresses of the hatched blocks 200 that correspond to values of C1 are created as a sub-LUT. More specifically, a sub-LUT (SUB_LUT_Entry[C1]) in FIG. 2 are SUB_LUT_Entry[C1]={0,9,17,24,29,32,35,37}

A numerical value in [ ] corresponds to the number of entries of the sub-LUT, and can take on values C1=0 to 7. Numerical values in { } represent the addresses (ordered as blocks are counted in the direction indicated by the arrow 203) of the hatched blocks 200 in the main LUT for values of C1. That is, SUB_LUT[0]=0, SUB_LUT[1]=9, SUB_LUT

[2]=17, .... The address of each block is defined such that the address of the lowermost left hatched block 200 is "0", that of an obliquely upper right hatched block 200 is "9", that of an obliquely upper right hatched block 200 is "17",and the like. By utilizing the created sub-LUT and the difference between the input values (C1 and C2), the address of the main LUT can be calculated by (address of main LUT)=SUB_LUT[$C1$]+($C2$−$C1$)    (1)

where C1≦C2.

The address of a block 204 for C1=2 and C2=5 is

SUB_LUT[2]+($C2$−$C1$)=17+(5−2)=20

The address ("20") of the block 204 is obtained.

For C1>C2, the address of the main LUT is calculated on the basis of the above-described symmetry:

(address of main LUT)=SUB_LUT[$C2$]+($C1$−$C2$)    (2)

As described above, according to the principle of the present embodiment, the LUT for obtaining an output value can be downsized as far as an output value for a plurality of input values has symmetry for the input values. Further, the LUT size can be minimized by considering the existence condition of a combination of input values. An address for looking up the LUT can be efficiently calculated at high speed by using the sub-LUT and the difference between input values.

The principle of the embodiment has been described for a two-dimensional LUT (two input values). However, the present invention is not limited to this, and can be applied to creation of an n-dimensional LUT.

To create an LUT, an input value must be an integer. For example, when an input value is required to have decimal-point precision, each input value is properly multiplied by an integer in advance, and then an LUT is created. According to this method, the element of an input value is converted into an integer in accordance with necessary precision even in a color space such as the L*a*b* color space which requires a floating-point number. The principle according to the embodiment can be applied to such color space.

First Embodiment

A method of obtaining the saturation in the YCC color space by utilizing the above-described principle will be explained.

Figure 3:
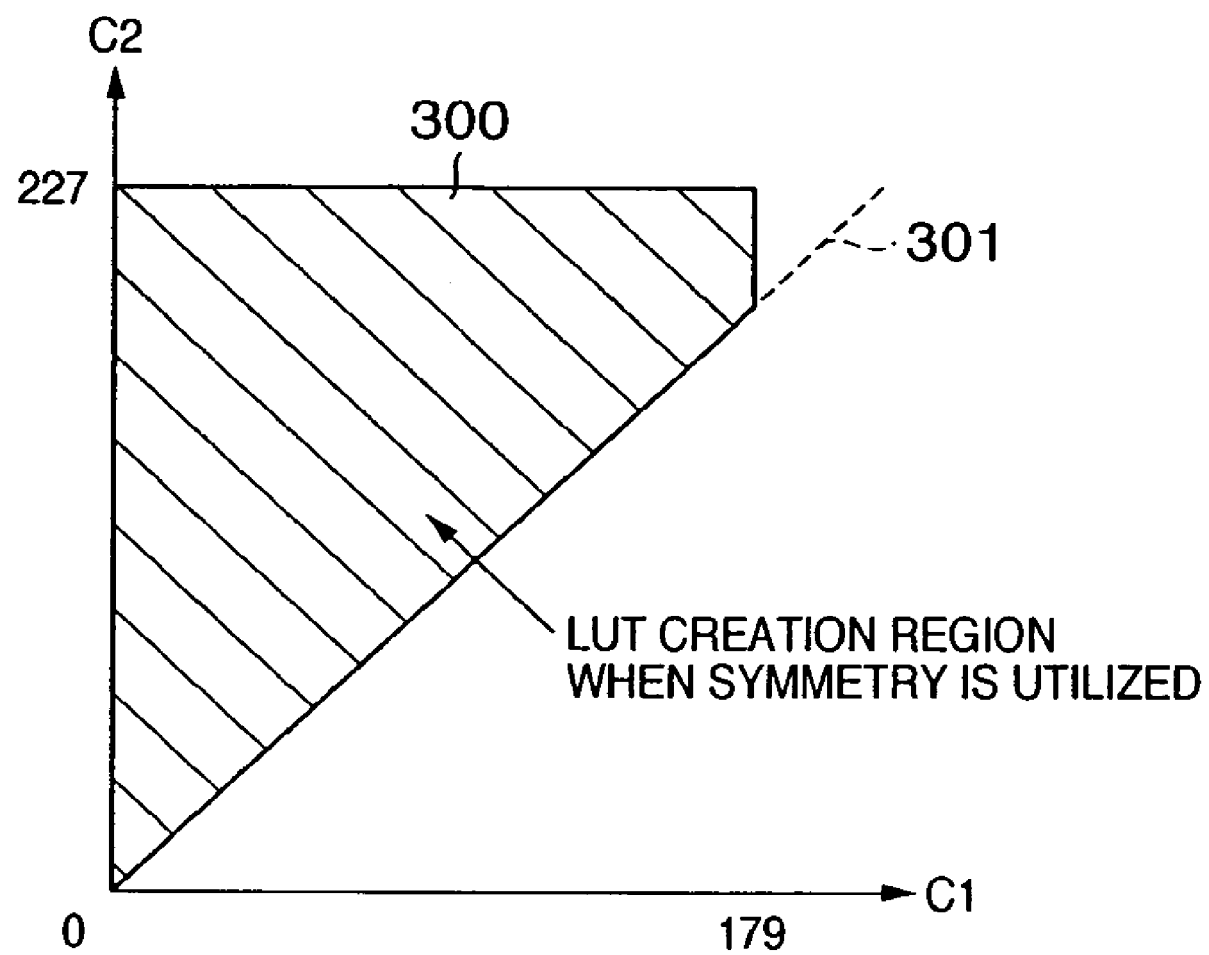
FIG. 3 depicts a graph for explaining an LUT region in consideration of symmetry of an output value for an input value.

Assume that a brightness and color difference signals for a 24-bit RGB image (8 bits for each color) are defined by $Y=0.3R+0.59G+0.11B$ $C1=\text{INT}[R-Y]$ $C2=\text{INT}[B-Y]$ where INT[x] means converting x into an integer. If the color difference signal must have decimal-point precision, x is multiplied by an integer in advance in accordance with necessary precision. In the first embodiment, the right of the decimal point is simply discarded. In FIG. 3, the possible ranges of two color difference signals C1 and C2 are

−178≦$C1$≦179

−226≦$C2$≦227

The saturation is calculated by the root sum square, which does not depend on the sign apparently. Hence, an LUT suffices to be created for a hatched portion 300 in FIG. 3. The first embodiment assumes creation of an LUT in the region 300 above a straight line 301 having a slope of "1". The maximum value of the absolute value of C1 is smaller than that of C2, and C1 is defined as the abscissa.

The existence condition of C1 and C2 will be considered.

Figure 4:
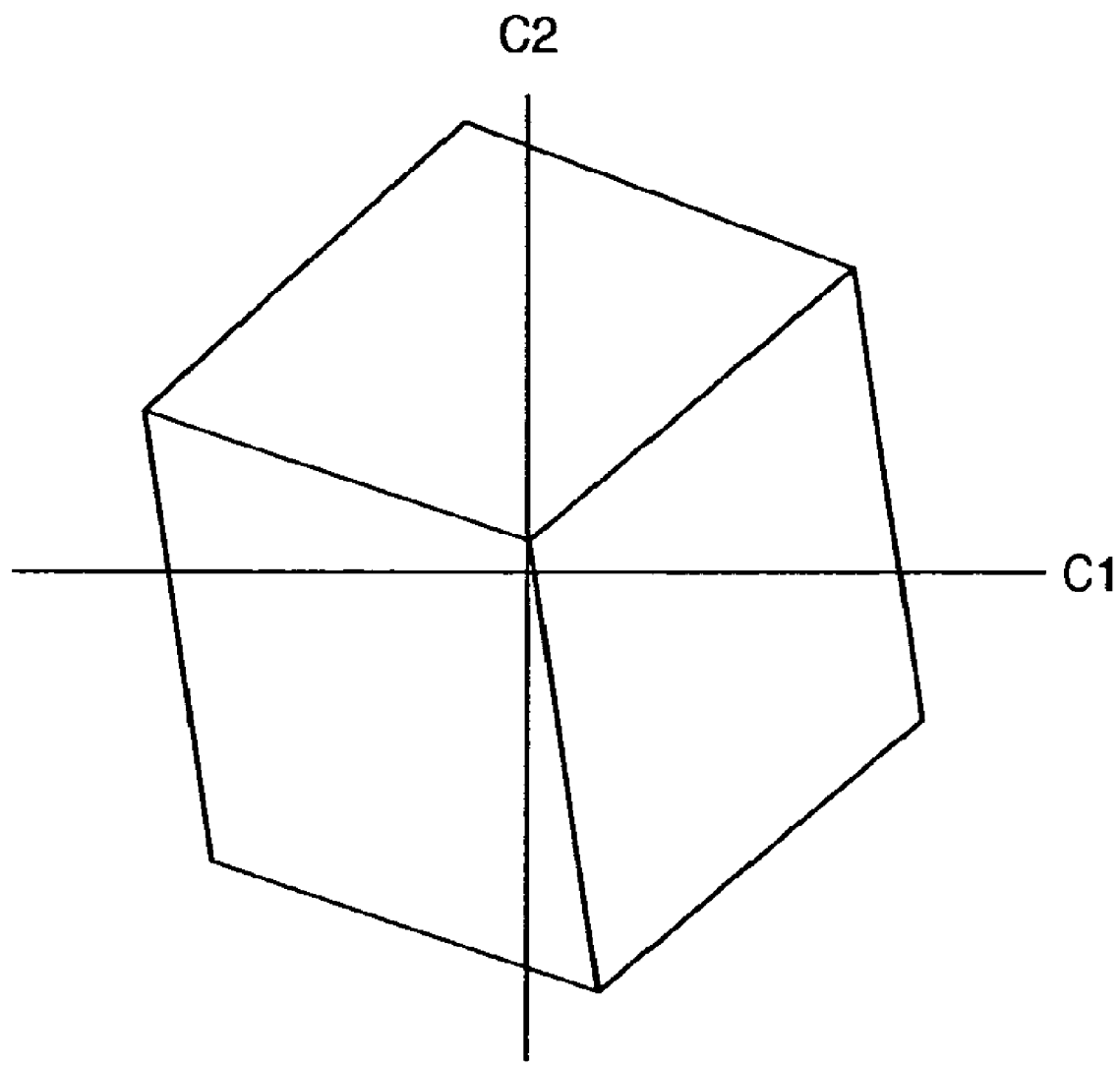
FIG. 4 depicts a graph for explaining an example of a color difference signal existence range in the YCC color space of an image signal.

FIG. 4 shows an example of a possible color difference signal range obtained from a 24-bit RGB image on the basis of the above definition. Since saturation calculation does not depend on the sign of the color difference signal, an LUT is created for a region formed by reversing the ranges of the second, third, and fourth quadrants about corresponding axes so as to overlap the first quadrant.

It should be noted that an address is calculated on the basis of the difference between C2 and C1, as described in the principle, and for C2<C1, an LUT must also satisfy the existence condition (maximum value) of C1 for C2. In other words, the smaller element C2 is defined as the abscissa, the larger element C1 is defined as the ordinate, and an LUT is created for all existent combinations.

Figure 5:
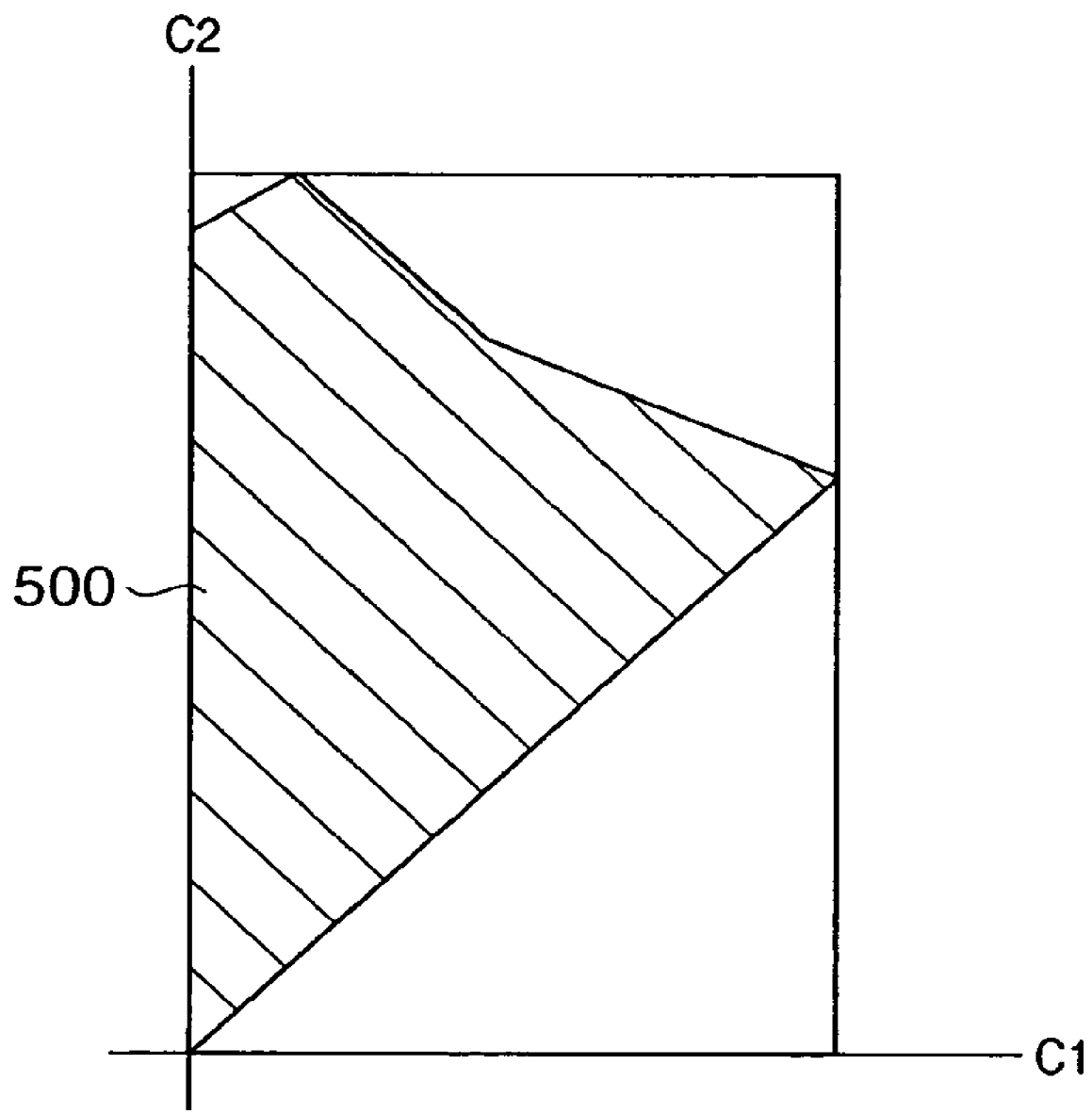
FIG. 5 depicts a graph for explaining an LUT region necessary to refer to the saturation in the color difference signal existence range of FIG. 4.

The range which satisfies these conditions is region 500 in FIG. 5. Compared to creation of an LUT in a rectangular region which covers the domains of C1 and C2, the number of entries of the LUT, i.e., the memory capacity required for storing LUT data can be reduced.

As described in detail in the principle of the present embodiment, saturation calculation is done in advance in this region to create a main LUT (S_LUT), and a sub-LUT (SUB_LUT), which stores LUT addresses above a straight line having a slope of "1" for elements along the abscissa, is created. As for arbitrary C1 and C2, (i) for C1≦C2, $S=\text{S\_LUT}[\text{SUB\_LUT}[C1]+C2-C1]$ (ii) for C1>C2

$S=\text{S\_LUT}[\text{SUB\_LUT}[C2]+C1-C2]$

The address of the main LUT (S_LUT) that represents the saturation can be obtained, thereby obtaining the saturation.

The LUT precision is arbitrarily set, as needed. If floating-point precision is required, a floating-point type array can be adopted. To save memory capacity, an integer-type array is adopted, and each element (=saturation) is multiplied in advance by an integer sufficient to obtain necessary precision. As described first in connection with the first embodiment, the precision can be increased by multiplying a color difference signal serving as an input value by an integer in accordance with necessary precision.

Second Embodiment

The second embodiment of the present invention will be described as a method of obtaining the hue angle. The saturation described in the first embodiment apparently has symmetry. The hue angle H is given by $H=\tan^{-1}(C1/C2)$ and does not seem to have symmetry. However, from a different viewpoint, the hue angle H can be regarded to have symmetry. That is, the second embodiment utilizes the fact that the angle has periodicity and the trigonometric function has a certain sort of symmetry about a straight line having a slope of "1".

Figure 6:
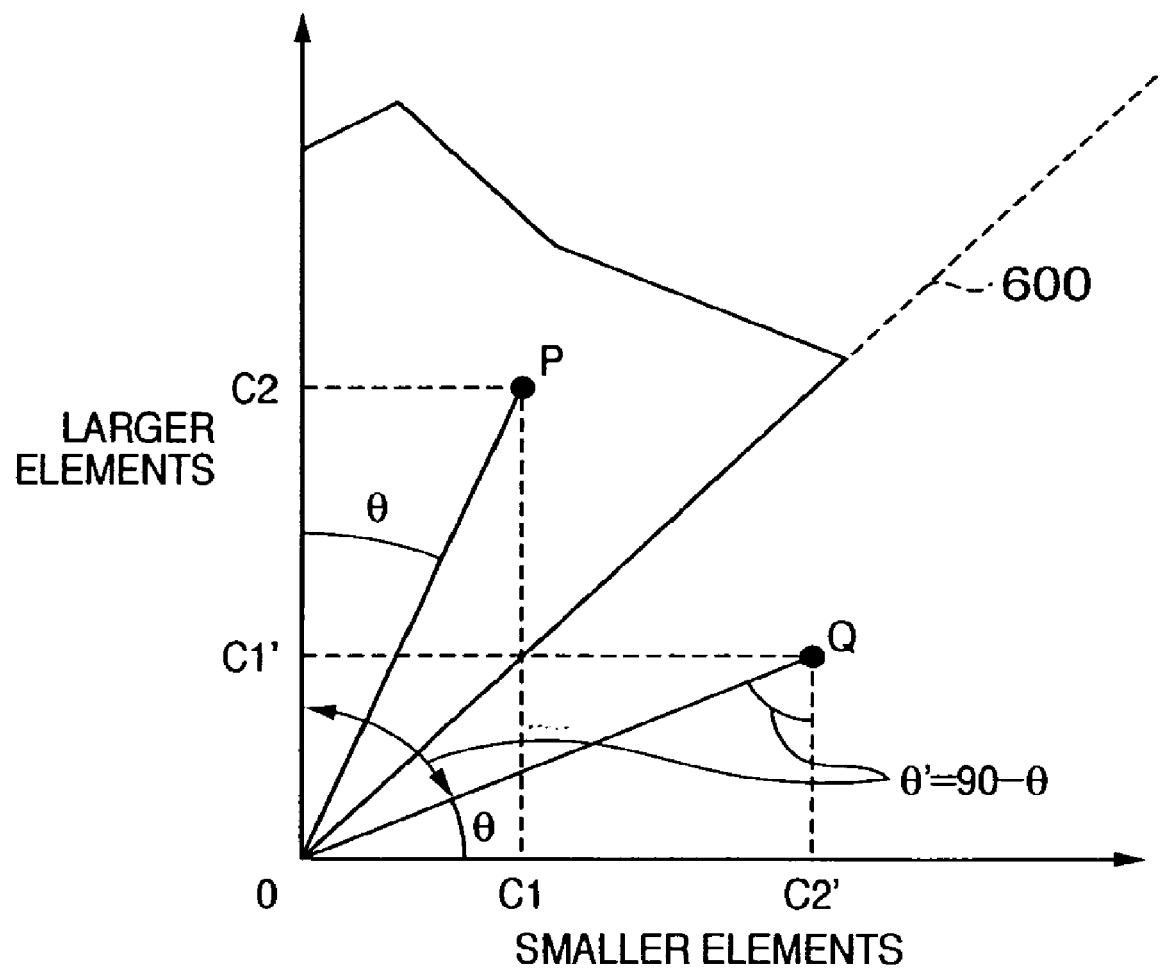
FIG. 6 depicts a graph for explaining symmetry of the hue angle according to the second embodiment of the present invention.
Figure 7:
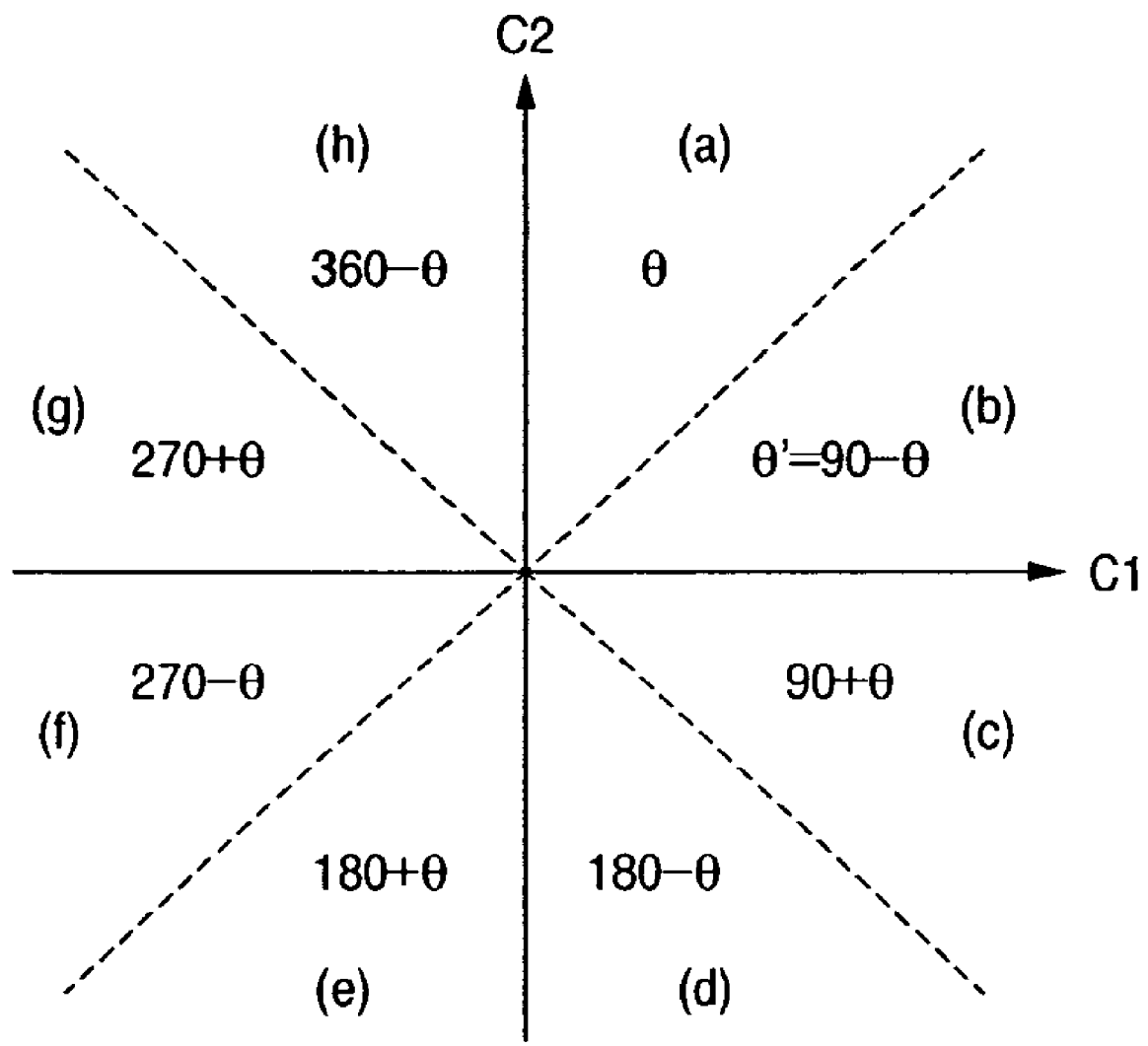
FIG. 7 depicts a graph for explaining an example of region division based on the signs of color difference signals and their magnitude relationship according to the second embodiment.

An angle θ' of a point Q (C2',C1') axisymmetrical about a straight line 600 having a slope of "1" can be calculated by (90°-θ) using an angle θ stored in correspondence with a point P (C1,C2) in FIG. 6. Furthermore, the range is divided into eight regions (a) to (h) in accordance with the signs of the input values C1 and C2 and their magnitude relationship, as shown in FIG. 7. The hue angle of each region can be calculated as shown in FIG. 7 on the basis of the angle θ of the first region (region (a)) obtained from the LUT.

The number of entries necessary for an LUT for referring to the hue angle also suffices to be the number of entries of the region (a), similar to the first embodiment described above.

According to the second embodiment, the principle of the present invention can be applied when a function for obtaining an output value for input elements has symmetry for the input elements, and also when the function does not have perfect symmetry but can be regarded to have symmetry from a different viewpoint.

Figure 8:
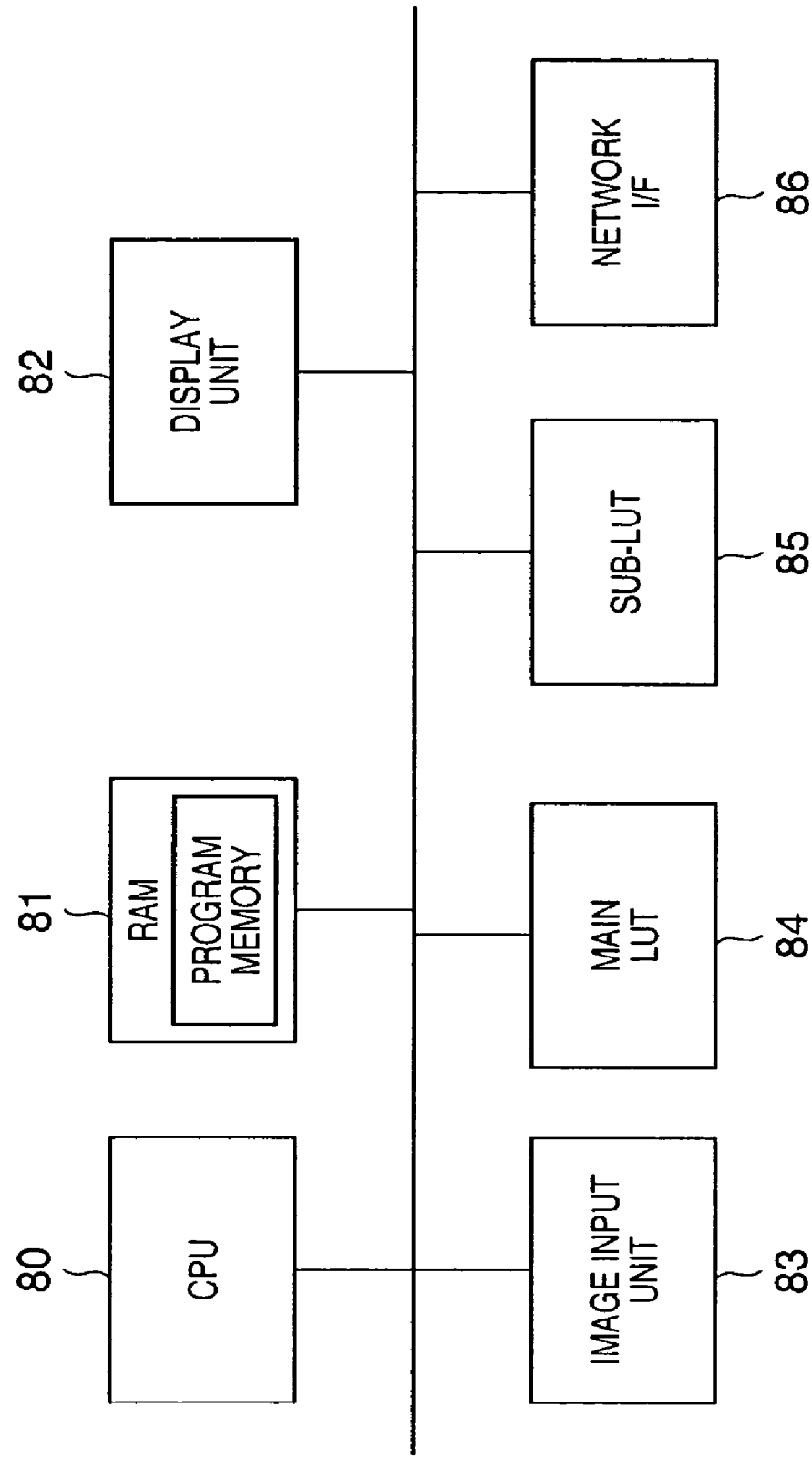
FIG. 8 depicts a block diagram showing the arrangement of an image processing apparatus according to the preferred embodiments of the present invention.

FIG. 8 is a block diagram showing the schematic arrangement of an image processing apparatus having the lookup table according to the above-described embodiments. Color correction of each pixel data of color image data input from an image input unit 83 will be explained.

Reference numeral 80 denotes a CPU such as a microprocessor which executes various control operations in accordance with control programs stored in the program memory of a RAM 81. Reference numeral 82 denotes a display unit such as a liquid crystal display or CRT which can display an input image or a color image having undergone color correction. The image input unit 83 may be, e.g., a tuner which receives a television signal, a playback device which inputs image data stored in a storage medium such as a CD, DVD, or VHS, or an interface which can input color image data from the Internet or the like. The image input unit 83 suffices to input color image data to the image processing apparatus. Reference numeral 84 denotes a main LUT described above. The main LUT 84 is downsized by utilizing the fact that an output value (saturation value) for a plurality of input values (color difference values) has symmetry for the input values (color difference signal). The main LUT 84 stores a saturation value corresponding to input color difference values. Reference numeral 85 denotes a sub-LUT described above which stores an auxiliary address for accessing the main LUT 84. Reference numeral 86 denotes a network interface which interfaces a communication line or network.

Figure 9:
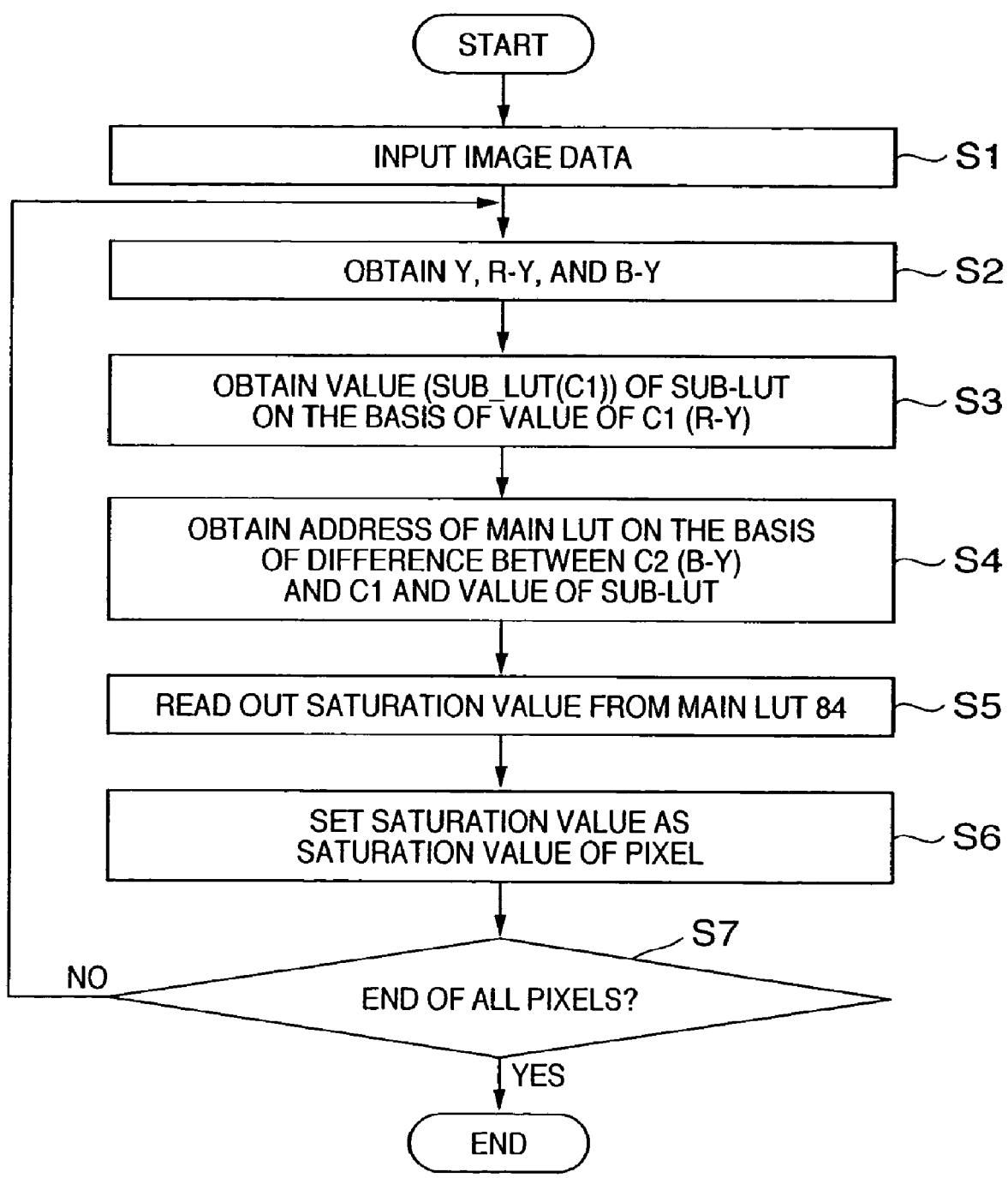
FIG. 9 is a flow chart for explaining color correction processing in image processing according to the preferred embodiments.

FIG. 9 is a flow chart for explaining processing executed in the image processing apparatus. The program which executes this processing is stored in the program memory. The CPU 80 executes the processing in accordance with the program stored in the program memory, realizing control processing.

In step S1, digital color image data (RGB data) is input from the image input unit 83. The processing advances to step S2 to obtain a brightness signal Y and color difference signals (C1 (R-Y) and C2 (R-B)) from RGB data of a given pixel of the input image data. The processing advances to step S3 to compare the color difference signals C1 and C2. The sub-LUT 85 is accessed on the basis of the value of a smaller color difference signal, in this case, C1 (C1≦C2), and an output [SUB_LUT(C1)] is obtained. The processing advances to step S4 to obtain the address of the main LUT 84 in accordance with the above-mentioned equation (1) (equation (2) for C1>C2) on the basis of the difference value between the color difference signals C2 and C1 and [SUB_LUT(C1)] obtained in step S3. The processing advances to step S5 to access the main LUT 84 on the basis of the address obtained in step S4 and read out data (in this case, a saturation value) from the main LUT 84. In step S6, the read saturation value is set as the saturation of the pixel. The processing advances to step S7 to determine whether all pixels of the input image data have been processed. If NO in step S7, the processing returns to step S2 to execute the above processing. If YES in step S7, color correction processing ends.

When image data output from the image input unit 83 is an analog signal, the image processing apparatus is equipped with an A/D converter which converts the analog signal into a digital signal. The digital image signal is then processed.

Other Embodiment

The present invention may be applied to a system including a plurality of devices (e.g., a host computer, interface device, reader, and printer) or an apparatus (e.g., a copying machine or facsimile apparatus) formed from a single device.

The object of the present invention is also achieved when a storage medium (or recording medium) which records software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the functions of the above-described embodiments are realized when an OS (Operating System) or the like running on the computer performs part or all of actual processing on the basis of the instructions of the program codes.

Furthermore, the present invention includes a case in which, after the program codes read out from the storage medium are written in the memory of a function expansion card inserted into the computer or the memory of a function expansion unit connected to the computer, the CPU of the function expansion card or function expansion unit performs part or all of actual processing on the basis of the instructions of the program codes and thereby realizes the functions of the above-described embodiments.

When the present invention is applied to the storage medium, the storage medium stores program codes corresponding to the above-described flow charts.

The above embodiments have described the YCC color space, but a lookup table may be created in another color space such as the L*a*b* uniform color space.

As has been described above, according to the embodiments, a saturation for arbitrary color difference signals can be efficiently acquired with a minimum memory capacity by creating an LUT on the basis of the principle described in the embodiments in a color space in which color processing is performed in advance.

According to the second embodiment, a hue angle for arbitrary color difference signals can be obtained with the same LUT size even for the hue angle by utilizing a combination of the signs of input signals and their magnitude relationship.

The present invention is not limited to the embodiments described above, and the principle of the present invention can be applied when an output value for a plurality of input values has or is regarded as having symmetry relative to the input values.

The present invention is not limited to the above embodiments and various changes and modification can be made within the spirit and scope of the present invention. Therefore, to apprise the public of the scope of the present invention, the following claims are made.

What is claimed is:

1. A color conversion method of inputting first and second color difference values and obtaining a corresponding saturation value, comprising steps of:

creating a main lookup table which stores saturation values for color difference values, and a sub-lookup table for obtaining a value corresponding to the first color difference value for accessing the main lookup table, wherein the first color difference value is equal to or less than the second color difference value;

accessing the sub-lookup table with the first color difference value to obtain the value corresponding to the first color difference value;

determining an address of the main lookup table in correspondence with the first and second color difference values on the basis of the value obtained in the accessing step and a difference between the first and second color difference values; and obtaining a saturation value corresponding to the first and second color difference values by accessing the main lookup table with the address determined in the determining step, wherein the main lookup table has a smaller number of entries than the number of all possible combinations of the first and second color difference values by utilizing symmetry of the saturation value for the first and second color difference values.

2. The method according to claim 1, wherein the sub-lookup table stores an address of the entry in which the first and second color difference values are the same.

3. An image processing apparatus for inputting image data and obtaining a corresponding saturation value, comprising:

calculation means for calculating a color difference value of each pixel of the input image data;

a main lookup table adapted to store saturation values for the color difference values;

a sub-lookup table adapted to obtain a value corresponding to a first color difference value being equal or less than a second color difference value, for accessing the main lookup table in correspondence with the first color difference value;

determination means for accessing the sub-lookup table with the first color difference value to obtain the value corresponding to the first color difference value and for determining an address of the main lookup table in correspondence with the first and second color difference values of pixels calculated by the calculation means, on the basis of the value corresponding to the first color difference value obtained by the sub-lookup table and a difference between the first and second color difference values; and read means for accessing the main lookup table with the address determined by the determination means and reading out a saturation value corresponding to the first and second color difference values, wherein the main lookup table has a smaller number of entries than the number of all possible combinations of the first and second color difference values by utilizing symmetry of the saturation value for the first and second color difference values.

4. The apparatus according to claim 3, wherein the sub-lookup table stores the address of an entry in which the first and second color difference values are the same.

* * * * *